(12) United States Patent
Kruse

(10) Patent No.: US 8,720,167 B2
(45) Date of Patent: May 13, 2014

(54) DEVICE FOR SUB-DIVIDING TUBULAR PACKAGING INTO PACKAGING UNITS

(75) Inventor: Holger Kruse, Hamburg (DE)

(73) Assignee: Tipper Tie Technopack GmbH, Glinde (DE)

( * ) Notice: Subject to any disclaimer, the term of this patent is extended or adjusted under 35 U.S.C. 154(b) by 728 days.

(21) Appl. No.: 11/917,573

(22) PCT Filed: Jun. 26, 2006

(86) PCT No.: PCT/EP2006/006152
§ 371 (c)(1),
(2), (4) Date: Aug. 13, 2008

(87) PCT Pub. No.: WO2007/000301
PCT Pub. Date: Jan. 4, 2007

(65) Prior Publication Data
US 2009/0113854 A1    May 7, 2009

(30) Foreign Application Priority Data

Jun. 27, 2005   (DE) .................... 20 2005 010 152 U

(51) Int. Cl.
*B65B 1/24* (2006.01)
(52) U.S. Cl.
USPC ............... 53/526; 53/436; 53/439; 53/450; 53/469; 53/480; 53/113; 53/523; 53/528
(58) Field of Classification Search
USPC ........... 53/428, 436, 439, 450–452, 469, 479, 53/480, 113, 121–122, 520, 522, 523, 526, 53/528
See application file for complete search history.

(56) References Cited

U.S. PATENT DOCUMENTS

| | | | | |
|---|---|---|---|---|
| 2,764,862 A | * | 10/1956 | Pickering | 53/374.8 |
| 2,958,169 A | * | 11/1960 | Flax | 53/469 |
| 3,748,690 A | | 7/1973 | Niedecker | |
| 3,872,543 A | | 3/1975 | Niedecker | |
| 4,015,021 A | * | 3/1977 | Harima et al. | 426/393 |
| 4,106,262 A | * | 8/1978 | Aterianus | 53/450 |
| 4,133,162 A | * | 1/1979 | Baumstingl | 53/450 |
| 4,262,473 A | * | 4/1981 | Brooke | 53/450 |

(Continued)

FOREIGN PATENT DOCUMENTS

| | | |
|---|---|---|
| DE | 26 01 595 | 7/1976 |
| DE | 25 50 042 A1 | 5/1977 |

(Continued)

OTHER PUBLICATIONS

E5 Zeichnung Nr. 03471, "Wurstführung VG", Zeichnungsdatum 9. Apr. 1991 mit SAP-Liste.

(Continued)

*Primary Examiner* — Christopher Harmon
(74) *Attorney, Agent, or Firm* — Casimir Jones S.C.

(57) ABSTRACT

The invention relates to an apparatus for subdividing a fed tubular packaging sleeve into packaging units, having two displacer groups which are intended for constricting the tubular packaging sleeve, it being possible for the rear displacer group, as seen in respect of the movement of the tubular packaging sleeve, to be moved in the longitudinal direction of the tubular packaging sleeve, and the apparatus comprises a supporting element which is connected to the rear displacer group and is intended for supporting the tubular packaging sleeve. The supporting element allows the tubular packaging sleeve to be transported away reliably.

11 Claims, 2 Drawing Sheets

(56) References Cited

U.S. PATENT DOCUMENTS

| | | | |
|---|---|---|---|
| 4,537,006 A | | 8/1985 | Pieri |
| 4,543,769 A | * | 10/1985 | Schmitz .................... 53/450 |
| 4,592,193 A | * | 6/1986 | Gustavsson .................... 53/530 |
| 4,979,353 A | * | 12/1990 | Seppala .................... 53/449 |
| 5,177,935 A | * | 1/1993 | Jones et al. .................... 53/433 |
| 5,241,804 A | * | 9/1993 | Tsuruta et al. .................... 53/504 |
| 5,400,569 A | * | 3/1995 | Jones et al. .................... 53/433 |
| 5,540,035 A | * | 7/1996 | Plahm et al. .................... 53/451 |
| 6,367,230 B1 | * | 4/2002 | Fukuda .................... 53/451 |
| 7,546,722 B2 | * | 6/2009 | Tsuruta .................... 53/551 |

FOREIGN PATENT DOCUMENTS

| | | |
|---|---|---|
| DE | 38 11 421 | 10/1989 |
| DE | 44 03 946 A1 | 8/1995 |
| EP | 0 123 655 | 11/1987 |
| GB | 1536476 | 12/1978 |
| GB | 2 100 110 A | 12/1982 |
| NL | 7 104 959 A | 10/1971 |
| WO | 94/07370 | 4/1994 |

OTHER PUBLICATIONS

E6 Rechnungen fur Full-Clip-Automat FCA 3441, teilweise inkl. Uberga-beprotokolle.

E7a Prospekt Full-Clip-Automat FCA 3401(Auszug).

E7b Prospekt Full-Clip-Automat FCA 3441 (Auszug mit SAP-Liste).

E7c Prospekt Full-Clip-Automat FCA 3442 (Auszug).

E8 Zeichnung Nr. 60256 FCA 03441 "Wurstfuhrung VG", Zeichnungsdatum 13. Dec. 1994, mit SAP-Stuckliste.

E9 Zeichnung Nr. 60252 FCA 03441 Rookworst 03441 kpl., Zeichnungsdatum 15. Dec. 1994, mit SAP-Stuckliste.

E10 Prospekt FCA 3441—Highlights, Druckdatum Jun. 1998.

E11 Zeichnung Nr. 65450 DCE 06410 "Auslauf kpl.", Zeichnungsdatum 20. Aug. 1996.

E12 Zeichnung Nr. 65660 DCE 06410 "Auslaufrolle kpl.", Zeichnungsdatum 24. Oct. 1996.

E13 Rechnungen fur Full-Clip-Automat DCE 6410.

E14 Auszuge aus dem Bedienungshandbuch des Full-Clip-Automaten DCE 6410.

Notice of Opposition EP Patent No. 1 758 791, May 15, 2008.

* cited by examiner

DEVICE FOR SUB-DIVIDING TUBULAR PACKAGING INTO PACKAGING UNITS

The invention relates to an apparatus for subdividing a fed tubular packaging sleeve into packaging units. It comprises two displacer groups which are intended for constricting the tubular packaging sleeve, it being possible for the rear displacer group, as seen in respect of the movement of the tubular packaging sleeve, to be moved in the longitudinal direction of the tubular sleeve.

Apparatuses of this kind are used, in particular, in sausage production, where filling machines fill a tubular packaging sleeve with a filling substance. In order to subdivide the filled tubular sleeve into packaging units, the displacer groups enclose the filled packaging sleeve and constrict it. The filling substance in the region of the displacers is forced out of the tubular sleeve as a result of the constriction.

During constriction, the two displacer groups are arranged immediately one behind the other, as seen in the longitudinal direction. Following constriction, the rear displacer group is moved away from the front displacer group by a spreading movement, and this results in a section between the two displacer groups which is free of filling substance. Closure clips can be fitted in the section which is free of filling substance, in order to close the packaging units on a permanent basis.

The tubular packaging sleeve which exits from the rear displacer group is transferred to a transporting-away arrangement, often to a conveyor belt. Since the rear displacer group moves in the longitudinal direction during the spreading movement, the tubular packaging sleeve cannot readily be transferred to a stationary transporting-away arrangement.

It is already known for a conveyor belt to be supported such that it can move as a whole in the longitudinal direction. During operation of the apparatus, the conveyor belt as a whole is moved back and forth, in which case it is synchronous with the movement of the rear displacer group. This keeps the distance between the rear displacer group and the conveyor belt constant and ensures a reliable transfer of the tubular packaging sleeve from the rear displacer group to the conveyor belt. One disadvantage of this solution is that the operating speed of the apparatus, on account of the large masses which have to be moved, is limited.

As an alternative, the conveyor belt is of telescopic design. That end of the conveyor belt which is in the vicinity of the displacers can be moved relative to the end which is remote from the displacers, in which case the length of the conveyor belt changes. It is therefore not the conveyor belt as a whole, but only the displacer end of the conveyor belt, which moves synchronously with the rear displacer group. This is mechanically complex.

The object of the invention is to provide an apparatus according to the preamble of claim 1 which is a straightforward construction and makes it possible for the tubular packaging sleeve to be transported away reliably. The object is achieved by the features of claim 1. Advantageous embodiments are found in the subclaims.

According to the invention, the apparatus comprises a supporting element which is connected to the rear displacer group. The supporting element accompanies the movement of the rear displacer group. The tubular packaging sleeve which exits at the rear displacer group rests on the supporting element. The supporting element ensures that the tubular packaging sleeve, following its exit from the rear displacer group, is already reliably guided before it has been transferred to the transporting-away arrangement.

Since the tubular packaging sleeve is guided by the supporting elements following its exit from the rear displacer group, it is possible to have a changing distance between the transporting-away arrangement and the rear displacer group. This makes it possible to arrange the transporting-away arrangement in a fixed position. The distance which changes during the movement of the rear displacer group is spanned by the supporting element.

The supporting element serves to support the tubular packaging sleeve in relation to gravitational force. The terms high, low, upwards, downwards and horizontally are thus used relative to the direction of gravitational force.

The invention can be used irrespective of the specific configuration of the displacers. A displacer group may be made up of linearly movable displacers, and it is likewise possible for the displacers to be designed for a pivoting movement. A displacer group may comprise two or more displacers.

For subdividing into packaging units, the tubular packaging sleeve is moved relative to the supporting element. In order to facilitate the relative movement between the supporting element and the tubular packaging sleeve, the supporting element may be equipped with rollers. In order to align the rollers in accordance with the movement direction, the axes of the rollers are preferably arranged horizontally and transversely to the longitudinal direction of the tubular packaging sleeve.

During the spreading movement, the rear displacer group covers a certain distance in the longitudinal direction. The distance which is to be spanned between the rear displacer group and a fixed transporting-away arrangement is at least equal to the distance covered by the rear displacer group. The supporting element therefore expediently has a longitudinal extent which corresponds at least to the movement distance.

The displacers of the two displacer groups, in addition to the spreading movement in the longitudinal direction, also execute a constricting movement perpendicularly to the longitudinal direction. The supporting element is intended to move only in the longitudinal direction. For this reason, the supporting element is preferably connected to an exclusively longitudinally moving carrying body of the rear displacer group, and not to the displacers themselves.

That end of the supporting element which is remote from the displacers may be arranged at a lower level than that end of the supporting element which is in the vicinity of the displacers. In this way, the gravitational force assists the movement of the tubular packaging sleeve in the longitudinal direction. In an advantageous embodiment, the inclination of the supporting element, that is to say the difference in height between the end which is in the vicinity of the displacers and the end which is remote from the displacers, is adjustable.

In order to allow the supporting element to be adapted to different types of tubular packaging sleeve, the supporting element may be connected in a height-adjustable manner to the rear displacer group.

The tubular packaging sleeve rests, in a supporting plane, on the supporting element. In order to ensure reliable lateral guidance of the tubular packaging sleeve on the supporting element, the supporting element may be equipped with lateral boundary surfaces which extend upwards beyond the supporting plane.

The apparatus according to the invention can interact with a separate transporting-away arrangement. In order to allow the components to be precisely coordinated, the transporting-away arrangement, however, preferably forms a constituent part of the apparatus. The supporting element may then be set up such that its end which is remote from the displacers, throughout the spreading movement of the rear displacer group, is arranged above the transporting-away arrangement, which is advantageously configured as a conveyor belt. According to an alternative embodiment of the invention, the supporting element itself can perform the function of the transporting-away arrangement, in which case it is possible to dispense with a separate transporting-away arrangement (e.g. a conveyor belt).

The invention is described by way of example hereinbelow using an advantageous embodiment and with reference to the accompanying drawings, in which.

Figure 1:
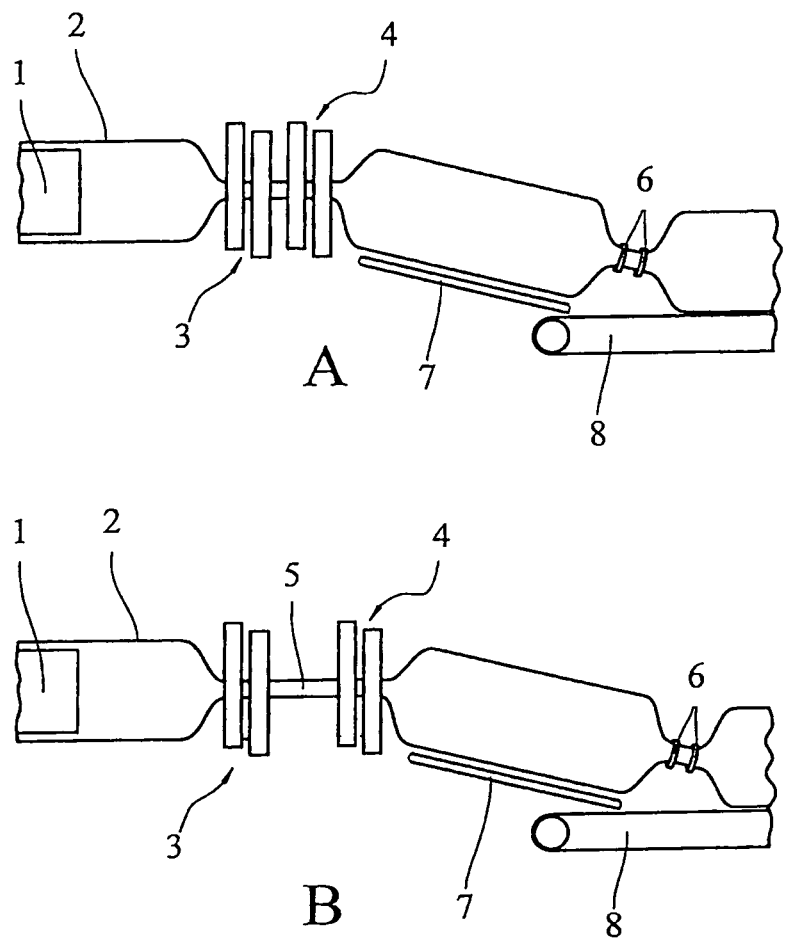
FIG. 1 shows a schematic illustration of an apparatus according to the invention.

In FIG. 1, a tubular packaging sleeve 2 is filled with a filling substance through a filling tube 1 of a filling machine (not illustrated). Parallel to the exit of the filling substance from the filling tube 1, an appropriate portion of the tubular sleeve 2 is drawn off from the outer circumference of the filling tube 1.

The tubular packaging sleeve 2 filled with filling substance is constricted, in phase A, by two groups 3, 4 of displacers. In order to produce a section 5 of the tubular packaging sleeve 2 which is free of filling substance, in phase B, the rear displacer group 4, as seen in the movement direction of the tubular packaging sleeve 2, is moved away from the front displacer group 3 by a spreading movement. Closure clips 6 may be fitted in the section 5 which is free of filling substance, these clips closing the individual packaging units of the tubular sleeve 2 on a permanent basis.

A supporting element 7 is connected to the rear displacer group 4, and this supporting element executes the spreading movement together with the rear displacer group 4. The tubular packaging sleeve 2 which exits from the rear displacer group 4 rests on the supporting element 7 and is transferred from the supporting element 7 to a transporting-away arrangement, which is designed as a conveyor belt 8.

The conveyor belt 8 is positioned such that that end of the supporting element 7 which is remote from the displacers is located above the conveyor belt throughout the spreading movement. For this purpose, the longitudinal extent of the supporting element 7 is greater than the distance covered by the supporting element 7 during the spreading movement. That end of the supporting element 7 which is remote from the displacers is arranged at a lower level than that end of the supporting element 7 which is in the vicinity of the displacers, in which case the movement of the tubular packaging sleeve 2 along the supporting element 7 is assisted by a gravitational force.

Figure 2:
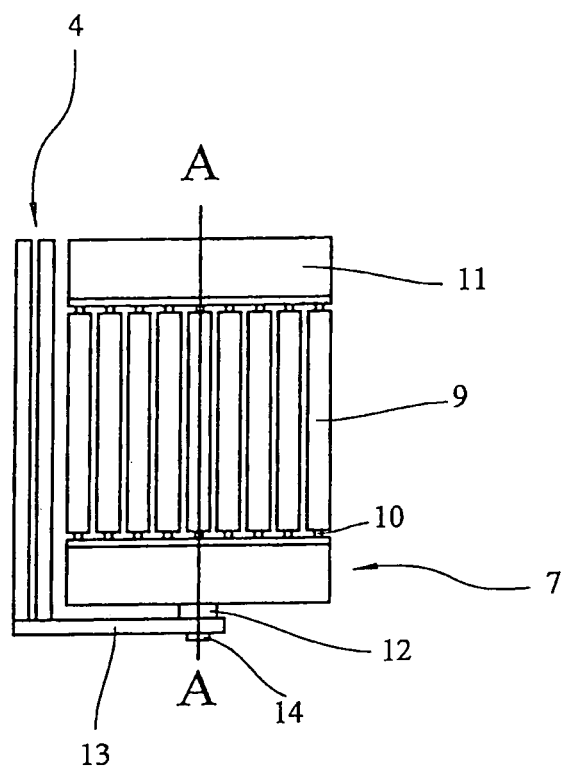
FIG. 2 shows a plan view of a supporting element according to the invention.
Figure 3:
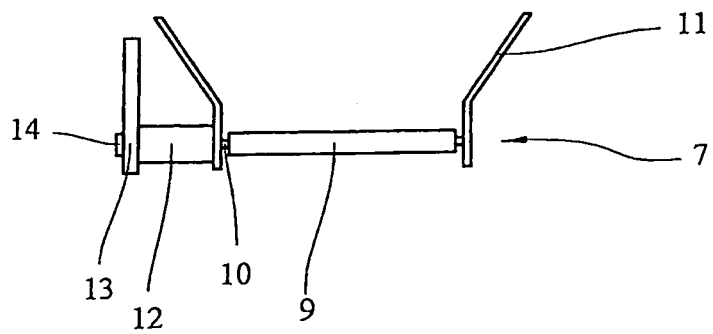
FIG. 3 shows a section through the supporting element of FIG. 2.

The supporting element 7, in FIGS. 2 and 3, comprises a plurality of rollers 9, of which the axes 10 are arranged horizontally and transversely to the longitudinal direction. As it moves along the supporting element 7, the tubular packaging sleeve 2 rolls on the rollers 9. Lateral boundary surfaces 11 are arranged adjacent to the rollers 9. The boundary surfaces 11 prevent the tubular packaging sleeve 2 from being able to leave the supporting element 7 towards one side.

The supporting element 7 is connected to a carrying body 13 of the rear displacer group 4 via an intermediate carrier 12. The supporting element 7 can be displaced upwards or downwards via a slot (not illustrated) in the carrying body 13. The inclination of the supporting element 7 can be changed by rotation about the axis of the screw 14.

The apparatus equipped, according to the invention, with the supporting element 7 facilitates the transportation of the tubular packaging sleeve 2 from the displacers 3, 4 to the conveyor belt 8. Immediately following its exit from the rear displacer group 3, the tubular packaging sleeve 2 rests on the supporting element 7. That end of the supporting element 7 which is remote from the displacers is arranged above the conveyor belt 8, in which case the tubular packaging sleeve 2 can easily be transferred to the conveyor belt 8.

The invention claimed is:

1. Apparatus for subdividing a fed tubular packaging sleeve (2) containing a filling substance into packaging units, the apparatus having two displacer groups (3, 4) each of which encloses and constricts the tubular packaging sleeve (2) containing the filling substance, wherein after constricting, and while each of the displacer groups (3,4) maintains its constriction of the tubular packaging sleeve (2), the rear displacer group (4) moves in the longitudinal direction of the tubular packaging sleeve (2) away from the front displacer group (3) by a spreading movement resulting in a section of tubular packaging sleeve that is free of filling substance (5), and wherein said apparatus comprises a supporting element (7) having an end that is connected to the rear displacer group (4) and an end that is remote from the displacer groups, wherein the tubular packaging sleeve (2) that exits at the rear displacer group (4) rests on said supporting element (7), and wherein said apparatus further comprises an arrangement (8) for transporting away the tubular packaging sleeve (2), wherein the end of the supporting element (7) that is remote from the displacer groups is arranged above the transporting-away arrangement (8).

2. Apparatus according to claim 1, characterized in that the supporting element (7) is equipped with rollers (9).

3. Apparatus according to claim 2, characterized in that the axes (10) of the rollers (9) are arranged horizontally and transversely to the longitudinal direction.

4. Apparatus according to one of claims 1 to 3, characterized in that the supporting element (7), as seen in the longitudinal direction, has a length which corresponds at least to the movement distance of the rear displacer group (4).

5. Apparatus according to claim 1, characterized in that the supporting element (7) is connected to a carrying body (13) of the rear displacer group (4).

6. Apparatus according to claim 1, characterized in that that end of the supporting element (7) which is remote from the displacers is arranged at a lower level than that end of the supporting element (7) which is in the vicinity of the displacers.

7. Apparatus according to claim 6, characterized in that the inclination of the supporting element (7) is adjustable.

8. Apparatus according to claim 5, characterized in that the supporting element (7) is connected in a height-adjustable manner to the rear displacer group (4).

9. Apparatus according to claim 1, characterized in that the supporting element (7) is bounded by side surfaces (11).

10. Apparatus according to 1, characterized in that the transporting-away arrangement is a conveyor belt (8).

11. Apparatus according to claim 1, characterized in that the supporting element (7) is designed as an arrangement for transporting away the tubular packaging sleeve (2).

* * * * *

UNITED STATES PATENT AND TRADEMARK OFFICE
CERTIFICATE OF CORRECTION

PATENT NO.      : 8,720,167 B2                                      Page 1 of 1
APPLICATION NO. : 11/917573
DATED           : May 13, 2014
INVENTOR(S)     : Holger Kruse It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 956 days.

Signed and Sealed this

Twenty-ninth Day of September, 2015

Michelle K. Lee
*Director of the United States Patent and Trademark Office*